United States Patent
Jacquin et al.

(10) Patent No.: US 9,021,420 B2
(45) Date of Patent: Apr. 28, 2015

(54) DEPLOYMENT OF BUSINESS PROCESSES IN SERVICE-ORIENTED ARCHITECTURE ENVIRONMENTS

(75) Inventors: Thierry Jacquin, St. Martin d'Uriage (FR); Adrian Mos, Meylan (FR)

(73) Assignee: Xerox Corporation, Norwalk, CT (US)

(*) Notice: Subject to any disclaimer, the term of this patent is extended or adjusted under 35 U.S.C. 154(b) by 33 days.

(21) Appl. No.: 13/410,691

(22) Filed: Mar. 2, 2012

(65) Prior Publication Data
US 2013/0232464 A1 Sep. 5, 2013

(51) Int. Cl.
*G06F 9/44* (2006.01)
*G06Q 10/06* (2012.01)
*G06F 9/445* (2006.01)

(52) U.S. Cl.
CPC *G06Q 10/06* (2013.01); *G06F 8/35* (2013.01); *G06F 8/36* (2013.01); *G06F 8/60* (2013.01)

(58) Field of Classification Search
CPC ............. G06Q 50/00; G06F 8/20; G06F 8/35; G06F 8/76
USPC .................................. 717/104, 102, 106, 120
See application file for complete search history.

(56) References Cited

U.S. PATENT DOCUMENTS

| | | | |
|---|---|---|---|
| 7,761,844 B2 * | 7/2010 | Bove et al. | 717/106 |
| 8,209,672 B2 * | 6/2012 | Ivanov | 717/136 |
| 8,340,999 B2 * | 12/2012 | Kumaran et al. | 705/7.12 |
| 8,370,794 B2 * | 2/2013 | Moosmann et al. | 717/104 |
| 2002/0062475 A1 * | 5/2002 | Iborra et al. | 717/108 |
| 2005/0144226 A1 * | 6/2005 | Purewal | 709/203 |
| 2005/0182787 A1 * | 8/2005 | Oswalt | 707/102 |
| 2007/0186209 A1 * | 8/2007 | Kaetker et al. | 717/104 |
| 2009/0089737 A1 | 4/2009 | Komatsu | |
| 2009/0158237 A1 * | 6/2009 | Zhang et al. | 717/100 |
| 2009/0254362 A1 | 10/2009 | Choubey et al. | |
| 2010/0325606 A1 * | 12/2010 | Sundararajan et al. | 717/105 |
| 2011/0004862 A1 | 1/2011 | Kejriwal et al. | |
| 2011/0066566 A1 * | 3/2011 | Adams et al. | 705/348 |

(Continued)

FOREIGN PATENT DOCUMENTS

WO  WO 2009082387 A1 *  7/2009  ............. G06Q 50/00

OTHER PUBLICATIONS

Bischof, Marc et al., BPEL/Script, www.bpelscript.org, Dec. 10, 2008, last accessed May 15, 2013.*

*Primary Examiner* — Qing Chen
*Assistant Examiner* — Andrew M Lyons
(74) *Attorney, Agent, or Firm* — Fay Sharpe LLP (57) ABSTRACT

A computer-implemented business process deployment system and method are disclosed. The system includes memory which stores a design tool which receives a business process description and generates a deployment package composite based thereon. The business process description includes a set of business process activities for a business process, each of the business process activities in the set depending on abstract services for implementing the business process activity. An abstract bindings repository stores mappings between the abstract services and corresponding real services employed by an associated real service employing system. The deployment package composite is configured to bind the abstract service dependencies to the real services in the abstract bindings repository to generate a deployable business process composite that is deployable in the associated real service employing system. A processor implements the design tool.

26 Claims, 7 Drawing Sheets

(56) References Cited

U.S. PATENT DOCUMENTS

| | | | |
|---|---|---|---|
| 2011/0088011 A1* | 4/2011 | Ouali ........................... 717/105 |
| 2011/0125553 A1 | 5/2011 | Mazzoleni et al. |
| 2011/0161921 A1* | 6/2011 | Garimella et al. ............ 717/105 |
| 2011/0162055 A1 | 6/2011 | Hinton et al. |
| 2011/0191383 A1* | 8/2011 | Addala et al. ................. 707/797 |
| 2011/0252037 A1 | 10/2011 | Abrahams et al. |

* cited by examiner

DEPLOYMENT OF BUSINESS PROCESSES IN SERVICE-ORIENTED ARCHITECTURE ENVIRONMENTS

BACKGROUND

The exemplary embodiment relates to business processes and their deployment in service-oriented environments.

Business processes (BPs) are often modeled in abstract terms by business users who do not need to be familiar with details of the Information Technology (IT) services that will ultimately be used to implement the processes. The business users use abstract processes which, after modeling, are then translated into implementable processes. This is often performed in the IT department of an organization. Deploying abstract business processes in operating environments with multiple service architectures poses several problems. While the business processes may be identical from a business user's perspective, different IT architectures may use semantically different services for the same capabilities.

Prior solutions to deployment across multiple architectures include mechanisms specific to individual business process management suites (BPMS). For example, the abstract business processes may be defined in a generic business process modeling language and then translated into executable artifacts, such as Business Process Execution Language (BPEL) scripts, which can then be deployed on runtime engines. The same abstract process may be translated into quite different scripts, depending on the service architectures which are available to implement them. A standardized deployment of the business process is thus not feasible in conventional systems where each architecture needs a customized deployment process. Integration with systems from different vendors or open-source packages is also difficult as the generation of the BPEL scripts or runtime is usually done in a proprietary (non-transparent) way. This type of solution is thus not suitable for a large variety of service-oriented architectures.

While generic deployment frameworks that target any software application and deployment mechanisms could, in theory, be used, these approaches are not particularly suitable for business processes where a much finer granularity is needed in controlling the various mappings between business process elements and IT assets.

There remains a need for a system and method for deployment of business processes which facilitates their implementation.

BRIEF DESCRIPTION

In accordance with one aspect of the exemplary embodiment, a computer-implemented business process deployment system includes memory which stores a design tool which receives a business process description and generates a deployment package composite based thereon. The business process description includes a set of business process activities for a business process, each of the business process activities in the set depending on at least one abstract service for implementing the business process activity. An abstract bindings repository stores mappings between the abstract services and corresponding real services employed by an associated real service employing system. The deployment package composite is configured to bind the abstract service dependencies to the real services to which they are mapped in the abstract bindings repository to generate a deployable business process composite that is deployable in the associated real service employing system. A processor implements the design tool.

In accordance with another aspect, a non-transitory computer storage medium stores a deployment package composite. The deployment package composite includes an activity mapping extractor that provides a plurality of business activity mapping composites. Each of the business activity mapping composites includes a business process activity and at least one abstract service as a dependency, for implementing the business process activity. A process composite generator generates a non-deployable business process composite from the business activity mapping composites provided by the activity mapping extractor. A deployment mechanism is configured for generating a deployable business process composite from the non-deployable business process composite by accessing an associated abstract bindings repository and binding the abstract services of the business activity mapping composites of the business process composite to real services provided by an associated real service employing system to which the abstract services are mapped in the abstract bindings repository and for generating executable artifacts based thereon.

In accordance with another aspect, a method of deploying a business process includes, with a computer processor, providing a plurality of business activity mapping composites, each business activity mapping composite corresponding to a business activity of a business process, each of the plurality of business activity mapping composites comprising a respective abstract service dependency. A business process composite is generated, which includes the plurality of business activity mapping composites. After generating the business process composite, the business process composite is deployed. This includes binding each of the plurality of abstract service dependencies to a respective one or more of a plurality of real services using an abstract bindings repository. At least one executable artifact is generated from the business process composite, the at least one executable artifact being configured to implement the business activities with at least one of the real services on a real service employing system.

In another aspect, a computer-implemented business process deployment method includes, with a computer processor, receiving a business process description, the business process description comprising a set of business process activities for a business process, each of the business process activities in the set depending on at least one abstract service for implementing the business process activity. The method further includes generating a deployment package composite based on the business process description, and with the deployment package, binding each of the abstract service dependencies to a real service, using a predefined abstract bindings repository which stores mappings between abstract services and corresponding real services employed by an associated real service employing system.

DETAILED DESCRIPTION

Aspects of the exemplary embodiment relate to a system and method for implementing business processes and, in particular, to a deployment package composite which facilitates translation of abstract business processes into executable business processes connected to IT assets. The exemplary deployment package composite is agnostic of operational environments while being self-contained with respect to data and dependencies. Being agnostic of operational environments facilitates portability across the various enterprise operational environments.

Figure 1:
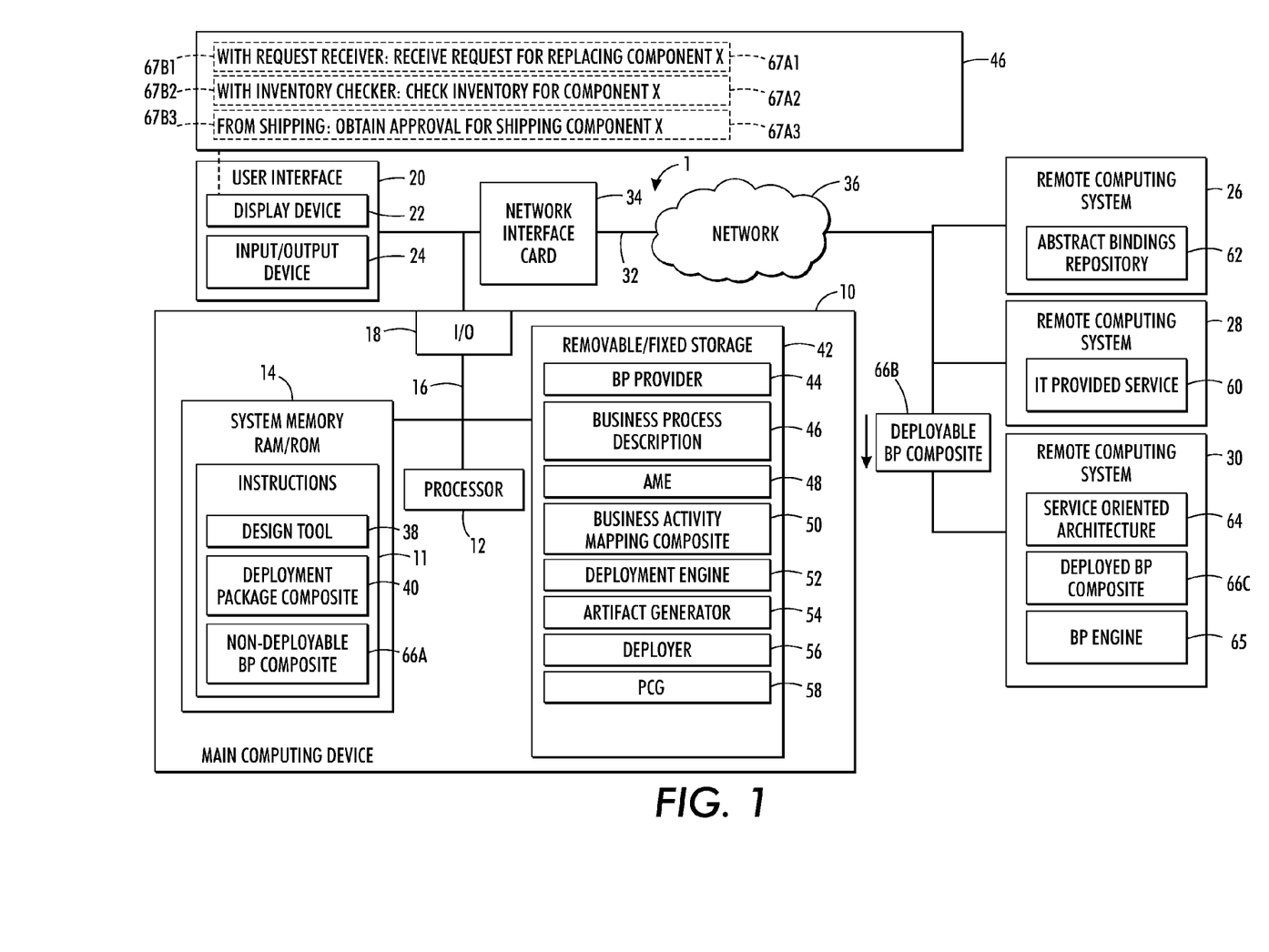
FIG. 1 is a functional block diagram of an exemplary computer system in accordance with one aspect of the exemplary embodiment.

With reference to FIG. 1, a functional block diagram of a computer-implemented deployment system 1 suitable for performing the exemplary method disclosed herein is shown. As will be appreciated, separate computer systems may be configured and connected for the deployment and for running individual services. The illustrated computer system 1 includes a main computing device 10 including a processor 12, which controls the overall operation of the computing device 10 by execution of processing instructions 11 which are stored in a memory 14 connected to the processor 12 by a bus 16. The processor 12 executes instructions 11 for performing the exemplary methods outlined in FIGS. 2 and 3.

The deployment system 1 may include multiple processors, wherein each processor is allocated to processing particular (sets of) instructions. Deployment system 1 also includes one or more interfaces to connect the main computing device 10 to external devices, including an input output (I/O) interface 18. The I/O interface may communicate with a user interface 20. The user interface 20 may include one or more of a display device 22, for displaying information to users, such as an LCD screen, and a user input device 24, such as a keyboard or touch or writable screen, and/or a cursor control device, such as a mouse, trackball, or the like, for inputting instructions and communicating user input information and command selections to the processor. The I/O 18 links the computing device 10 with external devices, such as the illustrated remote computing systems 26, 28, and 30, via a wired or wireless link 32. For example, I/O 18 may communicate with a network interface card (NIC) 34 which is in turn connected to a network 36, which links the main computing devices to computing systems 26, 28, and 30.

Memory 14 may store various software components, such as a design tool 38 and a deployment package composite 40. These components may in turn be composed of other components, explained further below. The system may also include a storage unit 42 which may be removable or fixed. The storage unit 42 may store, for example, data necessary to load into memory a business process provider 44, a business process description 46 stored in a Domain Specific Language (DSL), an activity mapping extractor (AME) 48, a plurality of business activity mapping composites 50, a deployment mechanism, which in the exemplary embodiment, includes a deployment engine 52, an artifact generator 54, and a deployer 56, and a process composite generator (PCG) 58.

The deployment package composite generates a business process composite 66 which at first is non-deployable (referred to herein as an non-deployable business process composite 66a) and which is made deployable (referred to herein as a deployable business process composite 66b), by linking its abstract services to real services, which can then be deployed (a deployed business process composite 66c). For convenience, reference may be made herein simply to a business process composite 66.

The main computing device 10 may include a PC, such as a desktop, a laptop, palmtop computer, portable digital assistant (PDA), server computer, cellular telephone, pager, or other computing device or devices capable of executing instructions for performing the exemplary method or methods described herein.

The memory 14 and storage 42 may be separate or combined and may represent any type of tangible computer readable medium such as random access memory (RAM), read only memory (ROM), magnetic disk or tape, optical disk, flash memory, or holographic memory. In one embodiment, the memory 14, 42 comprises a combination of random access memory and read only memory. In some embodiments, the processor 12 and memory 14 and/or 42 may be combined in a single chip. The computer memory 14 and/or 42 may include non-transitory computer readable media.

The I/O interface 18 of the computer system 1 may include a network interface card 34 to communicate with other devices via computer network 36, such as a local area network (LAN), a wide area network (WAN), or the Internet, and may comprise a modulator/demodulator (MODEM). The digital processor 12 can be variously embodied, such as by a single core processor, a dual core processor (or more generally by a multiple core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The remote computing systems 26, 28, 30, which may be separate or combined, may be similarly configured to the main computing device 10, i.e., may include memory and a processor. The remote computing systems 26, 28, 30, may provide access to real services, such as an IT provided service 60, and data such as an abstract bindings repository 62 which provides bindings from the abstract services (used by the mapping composite 50) to the real services 60. The remote computing system 26, 28, 30, may also host a real service employing system 64 (illustrated as a service oriented architecture, or SOA) which employs the real services 60 and which receives a deployable business process composite 66b from the deployment package composite 40. The remote computing system 26, 28, 30 may host a BP engine 65 capable of executing the deployable BP composite 66b. For example, the BP engine may be an execution engine for Business Process Execution Language (BPEL) scripts, or another type of runtime engine.

Exemplary Architecture

The design tool 38 receives a new business process description 46 and generates a deployment package composite 40 which can be used by computing system 28 for generating a business process (BP) composite 66*b* that is then output to the remote computing system 28.

In one embodiment, the deployment package composite 40 includes a deployment mechanism (including artifact generator 54) which generates executable artifacts from the new business process description 46, based on abstract services and assuming the existence of IT services 60 that will implement the abstract services in the SOA 64. These executable artifacts may be deployed on remote computing system 30 as a deployed business process composite 66*c*.

The business process description 46 is composed of one or more individual business process activities. The business process activities are described in abstract terms, i.e., at least some of the process activities are not linked to any specific service 60 of the service oriented architecture 64 that will implement them. For example, as illustrated in FIG. 1, a business process description 46 includes a set of activities 67*a*1, 67*a*2, 67*a*3, which are each to be performed with a respective abstract service 67*b*1, 67*b*2, 67*b*3. Although only one abstract service is shown for each activity, an activity may use multiple abstract services. The BP description 46 may be input to the computing device 10 from user interface 20. By generating an executable artifact from each business process activity and creating a composite from these artifacts, the deployment engine 52 creates a BP composite 66 that can be deployed to implement the business process. Each executable artifact may include a set of software instructions which are executable by a specified one or more of the real services 60. The deployment package composite instance 40 can thus be self-contained in that it may hold all the data required to execute the deployment of the business process in its target service oriented architecture 64.

The business process description 46 can be written in a Domain Specific Language (DSL). Existing Business Process Management Suites (BPMS) provide the ability to manage business processes from their creation to their execution. However, they typically use a generic business process modeling language, such as Business Process Modeling Notation (BPMN) for defining business processes. The use of a DSL provides significant advantages to enterprises, most notably improved agility (faster roll-out of new business processes) and governance (DSLs allow monitoring of business processes without a deep understanding of the IT implementation of the process). Using a DSL facilitates business people to use abstract architectural mappings for business process activities without being tied to IT service assets 60. To enable DSL-based solutions to be implemented efficiently, domain-specific editors and governance tools can be integrated with IT services and different runtime environments. This process of programming the interfaces and communication between the abstract interface 20 and the IT service assets 60 is referred to as binding. Binding the abstract services of the business process description 46 to the implemented services 60 provided by the IT infrastructure as late as possible in the deployment process helps to ensure that the deployment, not just the individual components, is portable from one architecture to another. The DSL-based solution is thus integrated with the IT, becoming a governance tool for implementing the process, rather than simply a description of the process.

The present deployment system 1 allows the binding to occur at deployment, rather than earlier in the development process. The deployment system 1 can thus accelerate implementation of new business processes and can improve governance by having similar business processes across multiple architectures of IT provided services. While the disclosed deployment mechanism does not require the use of a DSL, it is one approach to defining abstract descriptions of the IT services in the BP description 46.

To avoid being tied to a specific BPMS, the present deployment mechanism 56 assumes only the existence of abstract mappings from business process activities to abstract services and does not mandate any other BPMS specific capabilities. This approach preserves compatibility with a BPMS as well as any service-oriented execution platforms on which users may wish to deploy business processes.

The deployment engine 52 takes business process activities (in the BP description 46) with their abstract mappings as inputs and creates an executable artifact. Because each business process activity has an abstract architectural mapping, the business process 46 as a whole has an abstract architectural mapping. The business processes can be implemented by implementing the abstract services in each Service Oriented Architecture (SOA) 64 using the existing IT assets such as an IT service 60 of the SOA. Each Business Process 46 has a corresponding deployment package 40 which creates the execution artifacts required to implement the business process on the particular target SOA 64.

The deployment package 40 itself is a generic composite that can be generated automatically from a template stored in memory 42 which is instantiated differently for each business process 46 to be deployed and for each service oriented architecture 64 that is targeted. Thus, while each business process 46 has its own corresponding package 40, the packages may be built to include the same generic deployment engine 52. The deployment engine 52 can thus be stored as a generic component in storage 42 until a deployment package composite 40 is instantiated with its own instance of the deployment engine 52. This permits generality and reuse of the deployment engine 52 across architectures and also helps with the archival and management of deployment operations, ensuring roll-back is possible. As will be appreciated, in some embodiments, the deployment engine 52 may have different versions so that different deployment packages may have different deployment engines. For example, upgrades to the deployment engine may result in some variations between packages 40. The exemplary deployment engine 52 may output to multiple target SOAs, and is thus retargetable. Alternatively, each target SOA may have its own deployment engine 52, with each deployment engine having the same capabilities to process a business process description 46.

While the business process descriptions 46 may be created using abstract architectural mappings, the abstract services specified in the descriptions 46 are implementable by the target service oriented architecture(s) 64. While the mappings may exist between the abstract services and the real services used in the SOAs 64 which will actually implement the BP before the business processes 46 are created, this may not always be the case. In the case that a business process 46 uses an abstract service that is not implemented by the time of deployment, then an abstract architectural interface may either be implemented or the business process may be changed to use only implemented abstract services before deployment can continue.

Each business process activity 67*a*1, 67*a*2, 67*a*3 can be associated with one or more abstract services 67*b*1, 67*b*2, 67*b*3 that each correspond to one or more IT assets, primarily services 60 in the enterprise SOA. In some cases, a business process 46 may specify that the respective process activity is to be implemented by an abstract service which is a human rather than device software. Rather than specifying a human asset, a particular type of IT services can be used as a proxy for the human service in order to provide a consistent architectural representation. For example, if a particular business process specifies that there is to be a human approval at a certain level, then that approval can be captured by a system that, for example, sends an email as a reminder and pauses the business process until the approval has been entered in a database. This approval process, which may differ from system to system, can thus have an abstract interface that is implemented by the email and database systems of the different service oriented architectures.

The abstract services connect the business process to a generic, idealized form of the IT platform. Later in the deployment process, these abstract services are bound to (and implemented by) the real services in the SOA. An advantage of using an abstract service is that the business process does not have to be re-implemented for each SOA.

Since each business process composite 66a is constructed using business activities that are mapped to abstract services, the overall technical representation of the business process 46 corresponds to a valid abstract composition of its IT mappings. An abstract composition of the business process 46 is created by grouping individual business activity/abstract service compositions and optionally adding appropriate instructions (glue) that are configured for executing the process. The glue can be any logic that is not already captured in the specification of the business process (the specification being written in, for example, a Domain Specific Language or BPMN). The glue can be implemented in the logic of the business process activities or the business process composite 66.

As illustrated in FIG. 1, a person serving as a business process developer drafts a business process 46 in appropriate description language that may include a set of business activities 67a1, 67a2, 67a3 that are each to be implemented by a respective abstract service 67b1, 67b2, 67b3. Some or all of the abstract services 67b1, 67b2, 67b3 may be selected from a predefined set of abstract services stored in memory of the system 1. Once the business activities have been built using the abstract services, the business process composite (BP composite) 66a can be automatically constructed through hierarchical composition. This creates an abstract business process composition. Because the business process description 46 is not only a model but an actual software component, consistency is established between the business elements 67a1, 67a2, 67a3 and the abstract services 67b1, 67b2, 67b3. This consistency is very useful in the deployment operations as it enables efficient generation of executable artifacts and guarantees that evolutions in activity mappings and business processes are correctly reflected in the usage of the abstract services. The abstract services are then bound to the actual IT services 60 to be invoked in the context of the process execution.

The deployment process takes the BP abstract composition and creates the corresponding technical bindings for the target SOA 64. This is done by first creating a business process artifact and then connecting the abstract services for implementing the business process artifact to the real services that are available, either directly or through the abstract binding repository 62. The abstract bindings repository 62 may be manually initialized by a programmer or IT specialist who implements the abstract services using the existing IT infrastructure. The abstract binding repository 62 maps each of a predefined, finite set of abstract services 67b to a respective one (or more, but fewer than all) of a predefined, finite set of real services 60a,b,c, etc., for each of at least one service oriented architecture 64. Once created, the abstract bindings repository 62 is stored for later reuse when one of its mapped abstract services is used in a later deployment on the same target SOA 64. Each of a plurality of SOAs 64 can have a respective, different, abstract bindings repository 62.

Because the deployment package 40 for business processes is based on an architectural template itself, the business process can be instantiated differently for each deployment and target SOA, and the deployment package 40 instance can be created and archived for each deployment operation. The deployment package contains all the required data necessary to generate the deployable BP composite 66b and bind it to services in the target execution platform. This deployment package instance 40 can be archived for later use. Since the deployment package instance 40 is self-contained, it may continue to function independently from evolutions of the mappings to the underlying SOA, allowing an old deployment package that functioned correctly to be repeated. If operators decide to deploy a BP in a new context, they may generate a new deployment process composite 66b instance. This new deployment instance could be based on updated underlying business process activities and mappings to reflect changes in the business process activities and actual IT services. The deployment package can continue to function as long as the abstract services are implemented in real services 60.

Service Component Architecture (SCA)

The deployment composite may be implemented in various ways. Although the system described herein is not dependent on a particular technology, it is illustrated using a Service Component Architecture (SCA). Other technologies may be used.

Service Component Architecture (SCA) is a standard promulgated by the Organization for the Advancement of Structured Information Standards (OASIS) for describing and specifying application architectures in service-oriented environments. The specification's main elements are the composite and the component. Components are atomic units of specification (black boxes) that have an implementation type (e.g., a language such as BPEL or Java) as well as configuration parameters and dependencies, including exposed services (access means for the outside world). A composite may contain components connected to each other, and, as with any component, it can offer services and require dependencies. In fact, composites can be used as components in other composites. It may be noted that SCA promotes two types of reuse: logic reuse in the form of components that are instantiated in the context of their surrounding composite and instance reuse in the form of services that are connected to dependencies (external functionality, such as services 60, that is employed for tasks). Services offered by components can become 'external' services if they are consumed as dependencies, so a component could be used either as a service provider or as an 'instantiable' brick in various contexts. When used as a service, a component is assumed to run continuously in its environment and preserves its data regardless of its usage context. When used within a composite, as a reusable brick, a component is instantiated with the composite and its data is therefore not shared with other execution contexts. In SCA, dependencies are expressed as references that components and composites expose. They are bound to services, which are provided by other SCA composites/components or by another service provider, such as an enterprise service bus. Dependencies and references can be conceptually thought of as interface specifications from object oriented programming. A component or composite that makes a reference available is conceptually similar to an object that implements a particular interface. A component that has a dependency on another component is similar to a class that uses an interface.

Another aspect of SCA to be noted is the separation between logic/architecture and technological details. In fact, technological aspects of service invocations, component execution and various bindings are expressed as orthogonal concerns and connected to the architectural artifacts through configuration properties. Thus, architecture can be kept at a functional level for the purpose of architecture design and collaboration, and when required, it can be deployed to an SCA runtime after specifying 'how' various elements should be executed. Moreover, since the logical specification is separated from the technical details, a user or system designer can easily vary execution properties while preserving the same architecture. A typical example is choosing between various binding types (i.e., technologies for invoking services) for dependencies as well as for component services. A component can be written and its functionality offered over various network protocols, or an external service can be used through a variety of protocols. The SCA runtime handles the conversions.

The unit of deployment in SCA is the composite. When deploying SCA applications to SCA runtimes (e.g., open source, such as Apache Tuscany, or commercial ones available from IBM, Oracle, and others), composite files (.composite) are provided following standard conventions.

SCA offers a useful approach to hierarchical composition and reuse in the service oriented environments in which business processes are typically executed. SCA is a useful conceptual bridge between the business process management environment and Service Oriented Architecture (SOA). The SCA runtime also provides useful functionality for the specification of the deployment package 40, so the description below assumes an SCA runtime, although other approaches are contemplated.

Deployment of Business Processes Using Abstract Mappings

When defining business processes, individual business process activities can be connected directly to the service-execution capabilities of the enterprise, thus allowing any business process to be easily translated into an executable workflow on the platform of choice. This capability is enabled by providing mappings for each activity in order to specify how it should be grounded in the SOA 64. These mappings are with idealized or abstract services in order to ensure better portability across the enterprise, as well as encourage proper adoption of good SOA-practices in future evolutions of the enterprise SOA. These abstract services (AS) 67b can then be bound to the real services 60. This binding is accomplished by the deployment composite 40, with each business activity in the business process having one mapping composite. Although the description below uses SCA, other technologies are contemplated for this mapping.

Figure 2:
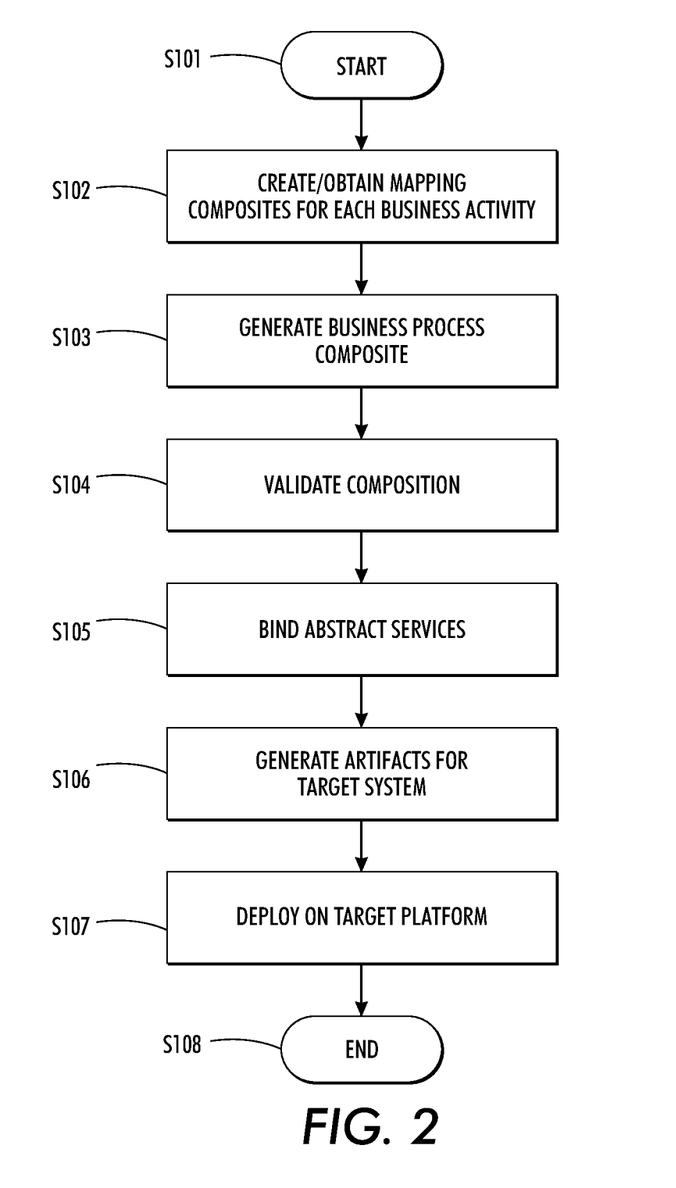
FIG. 2 is a flowchart illustrating a method of generating executable artifacts in accordance with another aspect of the exemplary embodiment.

FIG. 2 shows the deployment process activities for a given business process. At $S_{101}$, the process starts. The process then proceeds as follows:

At S102, the deployment engine 52, via a function call or other communication with the process composite generator 58 which in turn calls the activity mapping extractor 48, creates or otherwise obtains the business activity mapping composite 50 for each of the activities in the business process 46, which may be stored in BP provider 44. Each business activity may be an object or primitive in the chosen domain specific language. As will be discussed further, in the exemplary embodiment, this step is orchestrated by the deployment engine 52 but is executed by the activity mapping extractor 48.

At S103, the deployment engine 52, via the process composite generator 58, generates the business process composite, which contains the aggregated abstract mappings 50 for the entire process. Because the aggregated mappings of the business process composite are the aggregation of the abstract services used by the individual business activities, the business process composite is not yet deployable.

At S104, the deployment engine 52 optionally validates the composition by making sure the process is executable.

At S105, a request is received to deploy the business process composite in a particular SOA. The deployment engine then binds all the abstract service dependencies of the mapping composites to the real services 60 in the abstract bindings repository (ABR) 62. The ABR is a collection of connections between abstract services and real services. For each abstract service, there is a corresponding connection to a real service (or services) in the SOA. The abstract service name/real IT service location form a list of pairs maintained in the ABR. The real IT services connected via the ABR 62 are SOA services, such as IT-provided services 60 or compositions of IT provided services. The process for populating the ABR is described below with respect to FIG. 3. When deploying a business process composite, the real services returned by the ABR are filled in to the dependencies of the composite by the deployment engine.

At S106, the deployment engine 52 calls the deployer 56, which analyzes the target system 64 and generates the appropriate artifacts based on its requirements. The generation uses the BP Composite as the starting point and proceeds to generate executable artifacts such as BPMN 2.0 or BPEL scripts, SOA constructs such as deployment units for deploying on an Enterprise Service Bus, or indeed an executable BP Composite 66b that has the details necessary for a potential SCA runtime (if SCA is used as the SOA platform of choice for business processes).

At S107, the deployment engine 52 causes the deployer 56 to connect to the target platform 64 and request deployment of the generated artifact (such as the BP composite 66), or may wait until a request is received to deploy the BP composite. The deployment engine 52 may also notify a governance system that the deployment operation has finished. As noted above, the target platform may include a business process runtime engine 65, such as a business process execution language (BPEL) engine, in which the artifact 66c runs. Because the deployment engine 52 has filled in the abstract bindings with real IT services, the runtime engine 65 need not be aware of the abstract bindings repository. It receives a fully executable artifact that relies on implemented IT services.

The process ends at S108.

After the BP Composite is created (step S103) and validated (step S104), the deployment engine 52 instantiates the bindings (step S105) that refer to SOA services and connect them to actual services 60 in the enterprise SOA. Initially, the bindings in the non-deployable BP composite refer to abstract services 67b, which were inherited from the business activities, and which were implemented as business activity mapping composites. When generating a deployable artifact, the deployment engine 52 may implement each abstract service using IT services (e.g. IT provided service 60) in the SOA. The exemplary binding method (S105) is illustrated in FIG. 3.

Figure 3:
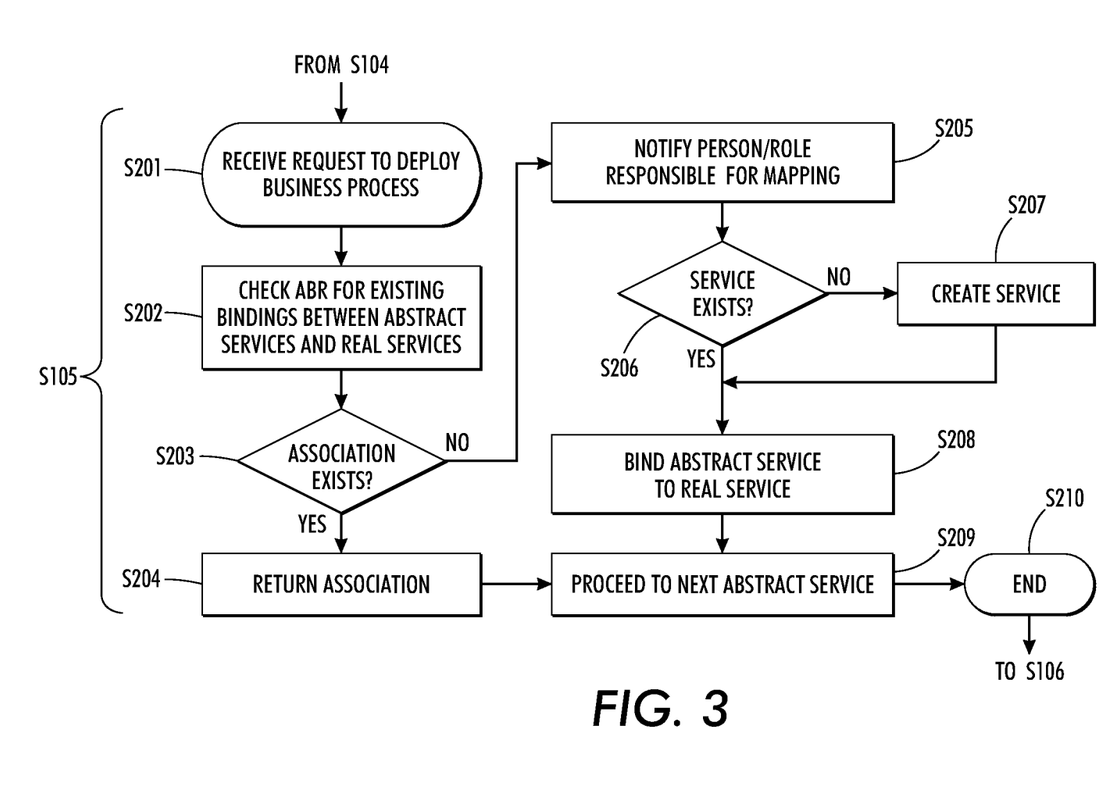
FIG. 3 is a flowchart illustrating a method of binding an abstract service to a real service in the method of FIG. 2.

With reference to FIG. 3, the method starts at S201, when a request is received, e.g., from an IT person or a creator of the business process description, or an automatically generated request, to deploy the business process in a specified SOA. At S202, the deployment engine 52 checks the abstract bindings repository 62 for an existing association between the abstract service 67b and the IT implemented services (e.g., IT provided service 60). At S203, if an association has been found (because a service mapping has already been performed), the association is returned in S204, and the deployment process continues at S209. If there is no association, the deployment engine 52 is unable to choose which service to which it is to bind the abstract service. In this case, a notification may be sent to the governance system to trigger a service mapping request, and, at S205, the service mapping request will be presented to the appropriate enterprise role/person which is responsible for connecting the abstract service to an actual service in the abstract bindings repository 62. The deployment is halted until the request has been satisfied. In other embodiments, the BP creator may be notified and given the opportunity to select another abstract service, to discontinue deployment, or the like. Services in the abstract bindings repository 62 may be automatically or manually derived from overall enterprise repositories or be specific composite services created specifically for the purposes of mapping with the corresponding abstract service 67b from the DSL mapping composites 50. The role/person that is responsible for the mapping may decide whether there is an appropriate service available or if one should be created. If it is determined that a mapping service is to be created, then any technology may be used for this (such as SCA) (S207). If a service 60 already exists, the mapping can be performed directly. Whether the new service 60 is created or already exists, the mapping composite 50 is then bound to the appropriate service at S208. If at S209, there are more abstract services to be mapped, the method then continues to the next abstract service. The process ends at S210, when each of the exposed dependencies from the non-deployable BP Composite is satisfied with an appropriate binding in the abstract bindings repository, creating a deployable BP Composite 66b. The method then returns to S106 (FIG. 2).

Figure 4:
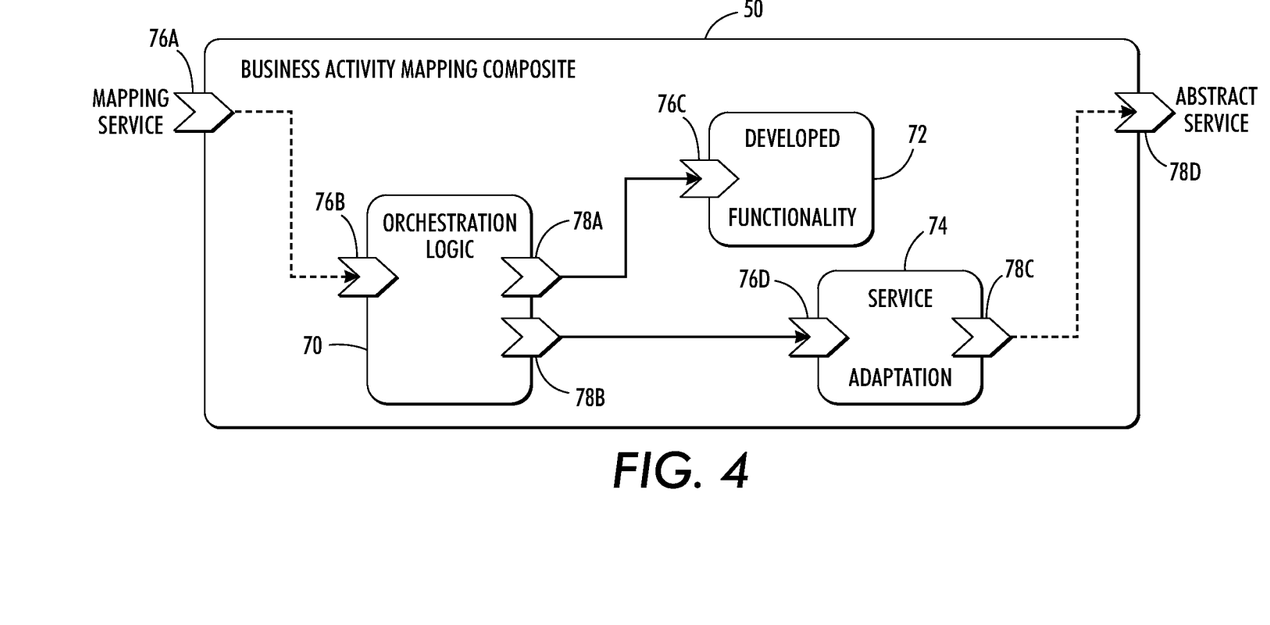
FIG. 4 is a functional block diagram of an exemplary business activity mapping composite employed in the system of FIG. 1.

With reference to FIG. 4, an exemplary business activity mapping composite 50 is shown which contains the appropriate logic to implement a business activity in an ideal SOA 64. Generally, multiple business activities form a business process. There may be multiple target SOAs of which SOA 64 is only one, but all of the target SOAs may use the same business activity mapping composite 50. That is, it is portable from SOA to SOA. The exemplary business activity mapping composite 50 includes three components 70, 72, and 74 which together provide the internal logic of the mapping composite 50, namely, an orchestration logic component 70, a developed functionality component 72, and a service adaptation component 74, although it is to be appreciated that the composite may include fewer or more than three components.

It may be noted that the chevrons used in FIGS. 4-7 represent interfaces between components, and that interfaces located on the left of a component are services that the component provides and those on the right are services on which it relies. For example, the interfaces (inputs) 76a-76d represent services offered by the components. The input 76a is offered by the composite as well. The interfaces (outputs) 78a-78d represent references (dependencies).

The orchestration logic component 70 serves to combine the results from the remaining two components and provides the service 76b to the composite 50. In SCA terminology, the service 76b is "promoted" as the composite service 76a.

The orchestration logic 70 may call upon several of the existing enterprise SOA services, human tasks, or other assets. It may request/generate new functionality, typically glue code for combining existing assets. The glue may be implemented in the developed functionality component 72. The developed functionality component 72 enables entirely new logic to be developed for some activities, while the service adaptation component 74 provides for reuse of abstract services in the enterprise SOA. For example, the abstract service (or a combination of abstract services) may not provide the interface that the orchestration logic 70 expects. The service adaptation component 74 then serves as a translation layer. The developed functionality component 72 corresponds to and implements the logic of a particular business activity. Some business activities may not need a developed functionality component.

The mapping composites 50 can refer to abstract services through dependencies 78d that are ideal and not initially bound to existing web-services in the enterprise repositories. These bindings are performed later in the deployment process to ensure that mapping composites contain an SOA representation that can be moved around various enterprise deployments and SOA repositories. Although only one dependency on only one abstract service is shown in FIG. 4, one mapping composite 50 could have two or multiple dependencies on two or multiple abstract services 67b.

A business activity mapping composite 50 is generally developed only once for each business process activity 67a and is stored in memory. The development may be typically done by IT experts together with domain experts in order to connect the business concepts properly to an idealized SOA.

As previously noted, multiple business activities can be combined to form a single business process. Each business activity has a corresponding SCA business activity mapping composite 50, and each business process can have a corresponding composite as well. Because the business process composite (BP composite) 66b is formed from composites 50 for business activities that are connected to the IT services, the BP composite 66b as a whole is connected to the IT services.

Figure 5:
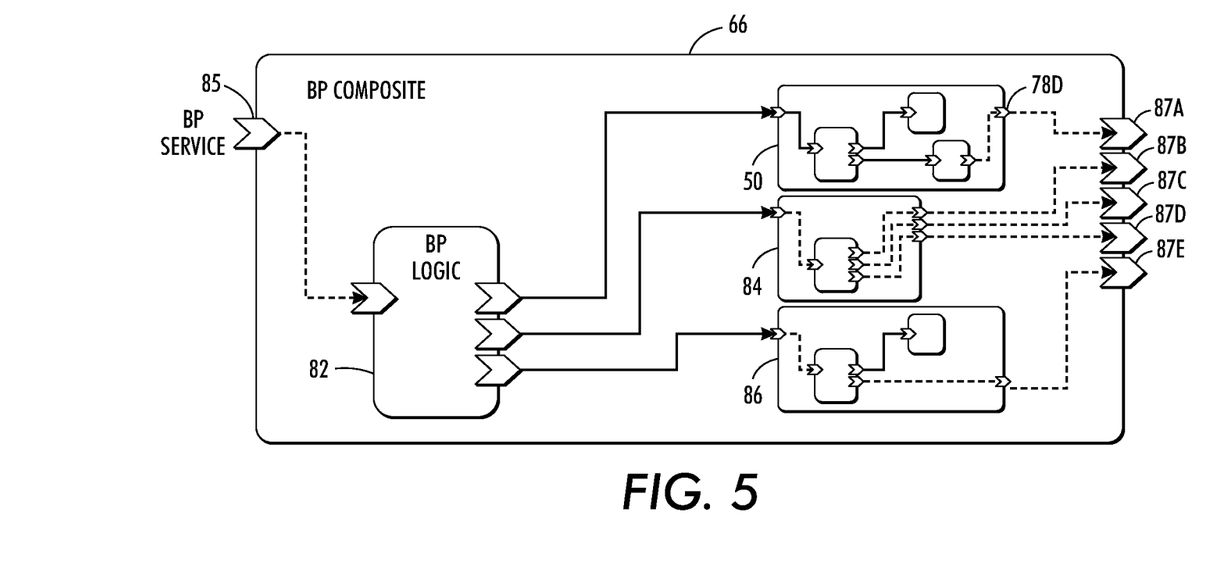
FIG. 5 is a functional block diagram of an exemplary business process composite employed in the system of FIG. 1.

Components of an exemplary BP composite 66 for an exemplary business process description 46 are illustrated in FIG. 5. These include a BP logic component 82 that orchestrates the other components. The BP logic component 82 is connected to the individual composites 50, 84, and 86, each corresponding to a respective BP activity and which serve as components of the BP composite. Composites 84 and 86 may be analogous to composite 50, except as noted. Each composite 84, 86 has an orchestration logic component 70 and may include one or more other components, analogous to components 72, 74. The business activity mapping composites 50, 84, 86 corresponding to the individual business activities of the business process are used in the BP composite 66 as components, exposing (promoting) their references (one of which is 78d of composite 50) to the containing BP composite at references 87a-e. The BP composite 66 therefore has a set of references corresponding to the union of the sets of references exposed by the individual mapping composites 50, 84, 86. The BP composite 66 provides interface 85.

In the illustrated embodiment, each business activity mapping composite 50, 84, 86 is used only once in the BP composite 66 even if the corresponding business activity appears multiple times the business process. This is enabled by the BP logic component 82 creating only one dependency for each mapping composite and reusing the same dependency for the different business process activities.

The BP composite 66 is then used by the deployment process. In one embodiment, the deployment can have some or all of the following properties:

1. It is independent of the execution platform, thus guaranteeing platform, and vendor, independence.

2. Deployment operations are controlled and archived, allowing advanced governance in line with agility needs of dynamic enterprises, where business processes can change quickly and often.

3. The deployment process uses the same technology as the business processes that it targets, thus enabling seamless reuse of governance solutions that are available for business processes. This is particularly true when mapping composites 50, 84, 86 and BP composites 66 are created using SCA.

The Deployment Engine

Figure 6:
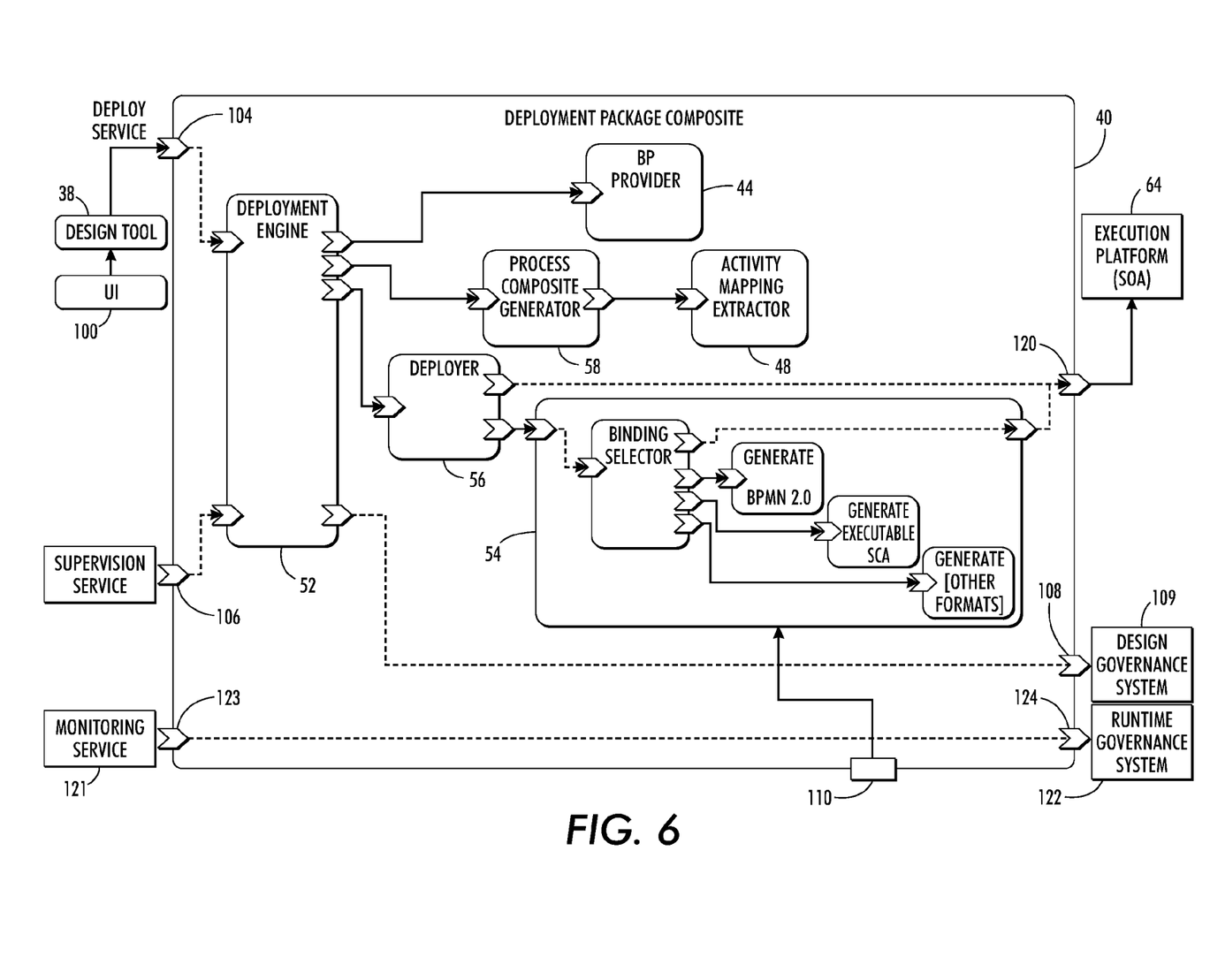
FIG. 6 is a functional block diagram of an exemplary deployment composite employed in the system of FIG. 1.

With reference to FIG. 6, the exemplary deployment engine component 52 is a component of the deployment package composite 40 and executes the processes illustrated in FIGS. 2 and 3. The deployment package composite 40 contains the appropriate logic and connectivity for creating the executable artifacts (a deployable BP composite 66b) for a specific target SOA 64. A deployment composite is generated for each business process and for each target architecture when the business process is ready for deployment. This generation creates a ".composite" file that contains the deployment logic and data for the respective business process including the current set of activity mappings and the entire context of the business process design. Archiving this ".composite" file preserves the historical perspective of each deployment operation for each business process, allowing reversion to a previous successful deployment even if elements in the design have changed. The deployment composite 40 may also provide services and references to the design tools to provide monitoring information.

As shown in FIG. 6, the deployment engine 52 may expose a deploy service 104 which is used by external entities, such as business process editors or other UIs, to initiate, stop, pause, or resume the deployment of a business process. These editors and UIs are represented by the generic design tool 38 having a UI 100. The deployment engine 52 may also expose a supervision service 106 that can be used to interrogate about the status of the deployment process, which may be useful for longer-running deployments. Apart from the references that this component 52 employs for connecting to other internal components, the deployment engine 52 may also expose a reference 108 to an external design governance system 109 that provides governance capabilities to listeners that seek notifications of deployment operations (success/failure), such as the design tools that triggered the deployment. This push-type functionality is complementary to the supervision service 106 which provides pull-type, on-demand information.

The BP provider 44 component contains the description 46 of the business process (in DSL, BPMN, or other process modeling language). This information may have been attached to the component 44 upon the creation (instantiation) of the composite 40, either by a constructor function or a function call triggered by the design tool 38. This information can be stored for archival reasons. Similarly, the activity mapping extractor (AME) 48 contains the business activity mapping composites, such as composite 50 (shown in FIG. 1), that are relevant for the business process description 46 stored in the BP provider 44. This information may also be stored as part of the composite archive. Together, the business process description 46 and the mappings 50 ensure that the deployment logic composite instance 40 is self-contained and, if required in the future, can be examined and repeated using its full original context, regardless of whether the business process description 46 or its mappings 50 have evolved.

The process composite generator (PCG) component 58 contains the logic for building the BP composite 66 from the business activity mapping composites 50, 84, 86, etc. that are provided by the AME 48. The AME 48 also archives the composites 50, 84, 86 for later retrieval, as the BP provider 44 archives the business process description 46 for later retrieval. The PCG 58 builds a non-deployable business process composite, as it only aggregates the mapping composites and does not bind them to a specific implemented IT provided service 60. That step is accomplished by the deployment engine, as described in FIG. 3.

Continuing with FIG. 6, the deployer component 56 is invoked by the deployment engine 52 when the BP composite is available from the process composite generator 58 and after the deployment engine 52 has bound the abstract services to implemented services 60. The deployer 56 generates the executable artifacts to deploy on the target platform. The BP Composite may not be deployable in its initial form, as the business process description 46 may not necessarily contain all the details required by the SOA 64 platform and its form may not be suitable for all platforms. Therefore, the deployer 56 takes the BP composite 66 and sends it to the artifact generator 54, which generates the deployable artifact 66b. The logic in the artifact generator 54 analyzes the target BP Engine 65 (for example, a BPEL Engine) and generates the appropriate artifacts depending on platform requirements. It can support multiple types of target platforms, such as BPMN 2.0 scripts, executable SCA, or other platforms. The exemplary artifact generator 54 is a composite that is used in the context of the deployment composite as a component, thus illustrating the hierarchical nature of SCA composition.

The deployer 56 also exposes a dependency 120, promoted at the composite level, to the execution platform 64. This dependency can connect the deployer to a service which offers information about the target platform 64 as well as a mechanism to offer information about the deployment to the execution platform.

The deployment package composite 40 may provide for connecting a monitoring service consumer 121 to an external runtime governance system 122 by a service 123 that passes through to a dependency 124. This can be used to provide real-time or aggregated monitoring information about the deployed BP composite 66c from the runtime platform to a consumer. The deployment composite 40 itself, being the unit of deployment for a business process, becomes the connection between a design tool 38 and the runtime platforms. Business process related tools need not be aware of runtime platforms and instead can connect only to the SCA composite that they generate, after its configuration and installation into the SCA deployment runtime. Furthermore, the monitoring service endpoint 123 can be distributed to any interested listeners which, by using it, are able to be instantly connected to monitoring information about the running BP composite 66c.

Deployment

Figure 7:
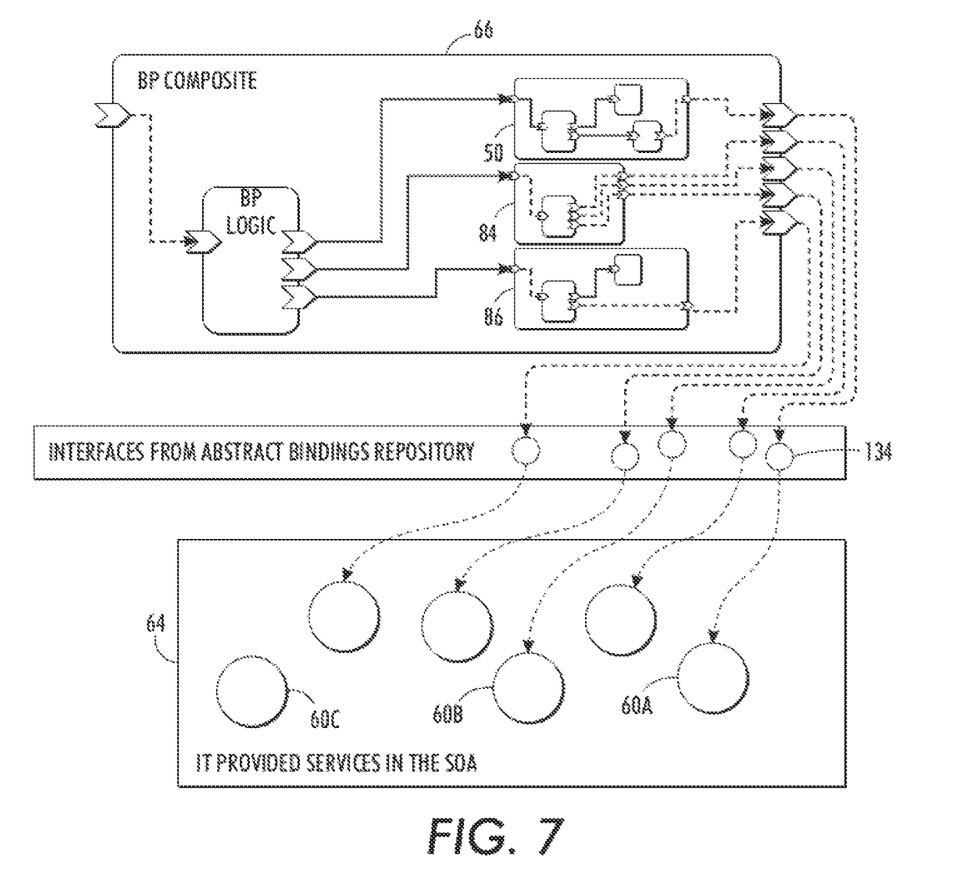
FIG. 7 is a functional block diagram of an exemplary architecture with an abstract bindings repository.

FIG. 7 illustrates the connection across an enterprise, achieved by bridging the various business process composites, such as composite 66, to the services layer 64 through interfaces from the abstract binding repository 62 in the deployment operation. As discussed above, the business activity mapping composite 50 is initially not bound directly to a service 60 in the SOA.

In FIG. 7, the uppermost layer shows an exemplary business process composite 66. One of its business activity mapping composites 50 is mapped to a corresponding one 60a of the IT-provided services 60. For simplicity, a one-to-one correspondence is shown, but one activity/BP composite may use a plurality of abstract services and one abstract service may use a plurality of IT-provided services 60. In some BP composites, some business activities may be identical and be implemented by the same business activity mapping composite 50, allowing some mapping composites to be used repeatedly. The dependencies of the BP mapping composite 66 are the aggregation of the dependencies of the individual business activity mapping composites, such as composite 50. The BP composite 66 exposes the dependency of business activity mapping composite 50 at dependency 68*d*. The second layer shown is the abstract bindings repository 66, containing the set of bindings 134. The dotted arrow connecting BP composite dependency binding 134 shows the effect of the binding operation in the deployment process. Since the binding 134 connects to service 60*a* in the SOA 64, the connection is thereby established between the BP composite 66 and the SOA service 60*a*. This cascading connectivity achieved through the exemplary deployment mechanism implemented by the deployment engine 52 and/or deployer 56 ensures the connection between the business process description 46 and the enterprise services, such as service 60*a*, in a portable and transparent manner.

This approach to deployment is suited to use in a variety of business process management environments. The mechanism can make use of existing SOA-based approaches and standards to create unique deployment composites that can be stored, shared, and executed in order to deploy business processes. Compared to other approaches, this solution creates a portable deployment package that is instantiated for each business process and that stores and executes individual deployment operations in a manner that is independent of, but which can operate in existing BPMS and SOA environments. This can ensure good governance of a business process lifecycle, which is valuable for agile business systems.

The exemplary system and method can ensure that business processes are deployed in an efficient manner across a wide range of platforms and integrate advanced governance solutions. The mapping process may also be parameterized for different enterprise environments. For example, each BP composite 66 may have additional components that realize some non-functional work that applies to all business processes. The pattern of using a central orchestration component 82 connected to the composites 50 could easily be extended to accommodate more functionality.

Various ways of generating the composites 40, 50, 66, are contemplated. For example meta-model based frameworks, such as the Eclipse Modeling Framework may be employed. Although other Business modeling frameworks such as BPMN are contemplated, a DSL-based environment can benefit particularly from this solution. However, any environment that has the appropriate mapping definitions for business process activities can benefit from the proposed deployment mechanism.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the method.

As will be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented business process deployment system comprising:
   memory which stores:
   a design tool which receives a business process description and generates a deployment package composite based thereon, the business process description comprising a set of business process activities for a business process, each of a plurality of the business process activities in the set depending on at least one abstract service from a predefined set of abstract services for implementing the business process activity; and
   an abstract bindings repository which stores a plurality of existing mappings, created before the business process description is created, between each abstract service in the predefined set of abstract services and a corresponding set of mapped existing real services, whereby for each abstract service, there is a corresponding connection to at least one existing real service, each set of mapped real services being employed by a respective real service employing system of a plurality of real service employing systems, each real service employing system including at least one different real service from others of the real service employing systems, the abstract bindings repository creating a consistent service interface for the plurality of real service employing systems;
   the deployment package composite being configured for deploying the business process on a target existing real service employing system of the plurality of real service employing systems by binding each of the abstract service dependencies of the business process activities to the corresponding set of mapped real services to which they are already mapped in the abstract bindings repository to generate a deployable business process composite that is deployable in the target existing real service employing system; and
   a processor which implements the design tool.

2. The deployment system of claim 1, wherein the business process description is written in a domain specific language.

3. The deployment system of claim 1, wherein the deployment package composite includes a business process provider component which includes the business process description.

4. The deployment system of claim 1, wherein the deployment package composite is configured to connect to an external runtime governance system of the target service real service employing system to provide a monitoring service which provides monitoring information about the deployable business process composite.

5. The deployment system of claim 4, wherein the design tool connects to the monitoring service of the deployment package composite.

6. The deployment system of claim 1, wherein the abstract bindings repository comprises a plurality of abstract bindings repositories, each of the abstract bindings repositories being specific to a respective one of the plurality of real service employing systems.

7. The deployment system of claim 1, wherein the deployment package composite comprises a deployer which generates executable artifacts executable on the target real service employing system, each of the executable artifacts corresponding to a deployed version of at least a portion of the business process.

8. The deployment system of claim 1, wherein the deployment package composite generates executable artifacts executable on the target real service employing system, each of the executable artifacts comprising a business process activity mapped to a respective one of the real services.

9. The deployment system of claim 1, wherein the deployment package composite includes an artifact generator which generates executable artifacts executable on the target real service employing system, each of the executable artifacts corresponding to at least a portion of a deployed version of the business process.

10. The deployment system of claim 1, wherein the design tool or deployment package composite is configured for creating a business activity mapping composite for each of the business activities which links a mapping service to the abstract service.

11. The deployment system of claim 10, wherein the deployment package composite is configured for generating a business process composite from a plurality of the business activity mapping composites, the business process composite linking a business process service to the abstract services of the plurality of the business activity mapping composites.

12. The deployment system of claim 1, wherein the deployment package is generated from a deployment package template stored in memory.

13. A non-transitory computer storage medium which stores a deployment package composite, the deployment package composite comprising:
an activity mapping extractor that provides a plurality of business activity mapping composites, each mapping composite comprising a business process activity and an abstract service activity as a dependency, for implementing the business process;
a process composite generator that generates a non-deployable business process composite from the business activity mapping composites provided by the activity mapping extractor which aggregates the abstract service activities of the business activity mapping composites; and
a deployment mechanism which generates a deployable business process composite from the non-deployable business process composite by accessing an existing associated abstract bindings repository and binding the abstract services of the business activity mapping composites of the business process composite to existing real services provided by an associated real service employing system to which the abstract services are already mapped in the abstract bindings repository and generates executable artifacts based thereon, the associated real service employing system being one of a plurality of real service employing systems, each of the plurality of real service employing systems having a mapping in the abstract bindings repository, whereby for each abstract service, there is a corresponding connection in the abstract bindings repository to at least one of the existing real services.

14. The storage medium of claim 13, wherein the deployment mechanism comprises:
a deployment engine which calls the process composite generator to generate the non-deployable business process composite; and
a deployer that is invoked with the business process composite and which invokes an artifact generator to generate the executable artifacts, the deployer deploying the business process composite to the real service employing system.

15. A method of deploying a business process comprising:
with a computer processor, providing a plurality of business activity mapping composites, each business activity mapping composite corresponding to a business activity of a business process, each of the plurality of business activity mapping composites comprising at least one respective abstract service dependency;
generating a business process composite which includes the plurality of business activity mapping composites;
after generating the business process composite, deploying the business process composite to a first real service employing system, comprising:
binding the plurality of abstract service dependencies to respective ones of a plurality of real services using an existing abstract bindings repository, the real services being implemented in the first real service employing system of a plurality of real service employing systems, each of the plurality of real service employing systems having a mapping in the abstract bindings repository to an abstract service, the mapping between abstract services and the real service employing systems having been created before the business process composite is created, the mapping creating a connection between the abstract dependencies to and the real services implemented in the plurality of real services; and
generating a first executable artifact from the business process composite, the first executable artifact being configured to implement the business activities with at least one of the real services on the first real service employing system;
deploying the business process composite to a second real service employing system, comprising:
binding the plurality of abstract service dependencies to respective ones of a plurality of real services using the abstract bindings repository, the real services being implemented in the second real service employing system of the plurality of real service employing systems; and
generating a second executable artifact from the business process composite, the second executable artifact being configured to implement the business activities with at least one of the real services on the second real service employing system.

16. The method of claim 15, wherein each business activity is an object or primitive in a domain specific language.

17. The method of claim 15, further comprising connecting to the real service employing system and requesting deployment of the executable artifact.

18. The method of claim 17, further comprising, after connecting to the real service employing system, notifying a governance system that the deployment has finished.

19. The method of claim 15, wherein the generating of the at least one executable artifact from the business process composite comprises generating a plurality of executable artifacts, each of the executable artifacts being configured to implement at least one of the business activities with a respective at least one of the real services.

20. The method of claim 15, wherein the executable artifacts comprise at least one of BPMN and BPEL scripts.

21. The method of claim 15, wherein the executable artifacts comprise deployment units for deploying on an enterprise service bus.

22. A computer program product comprising a non-transitory recording medium storing instructions, which when executed on a computer causes the computer to perform the method of claim 15.

23. A computer system comprising memory storing instructions for performing the method of claim 15 and a processor, in communication with the memory, for executing the instructions.

24. A computer-implemented business process deployment method comprising:
    with a computer processor, receiving a business process description, the business process description comprising a set of business process activities for a business process, each of the business process activities in the set depending on at least one abstract service for implementing the business process activity;
    generating a deployment package composite based on the business process description, the deployment package comprising a deployment engine; and
    with the deployment engine, binding each of the abstract service dependencies of the deployment package composite to a real service, using a predefined abstract bindings repository which stores mappings between abstract services and corresponding existing real services employed by an associated real service employing system, the associated real service employing system being one of a plurality of real service employing systems, each real service employing system corresponding to a mapping in the abstract bindings repository, and wherein the mapping between the abstract services and the real service employing systems is created before the deployment package is created.

25. The method of claim 24, wherein the business process description describes a business process in a domain specific language or in business process modeling notation.

26. The deployment system of claim 1, wherein a list of real services available in a respective real service employing system is derived from a plurality of enterprise repositories, each of the enterprise repositories being specific to a respective one of a plurality of real service employing systems, the set of mapped real services being derived from the list of real services available in the respective real service employing system.

* * * * *